United States Patent [19]

Psarris

[11] 4,205,652
[45] Jun. 3, 1980

[54] PORTABLE BRAZIER

[76] Inventor: Alice Psarris, 222 Wm. G. Dr., Tewksbury, Mass. 01876

[21] Appl. No.: 806,491

[22] Filed: Jun. 14, 1977

[51] Int. Cl.² .................. F24C 1/16; A47J 37/07; F24B 3/00
[52] U.S. Cl. .................. 126/9 R; 126/25 R
[58] Field of Search .................. 126/9 R, 9 B, 25 R, 126/25 A, 37 R, 37 B

[56] References Cited

U.S. PATENT DOCUMENTS

| | | | |
|---|---|---|---|
| 1,438,345 | 12/1922 | Tait et al. | 126/9 R |
| 2,530,166 | 11/1950 | Johannsen | 126/9 R X |
| 2,787,996 | 4/1957 | Rumsey | 126/9 R X |
| 2,917,039 | 12/1959 | Sheedlo | 126/9 R |
| 3,182,585 | 5/1965 | Rensch et al. | 126/9 R X |
| 3,393,670 | 7/1968 | Psarris | 126/9 R X |
| 3,515,119 | 6/1970 | Kivela | 126/37 |
| 3,537,388 | 11/1970 | Martin | 126/9 R X |
| 3,688,757 | 9/1972 | Dusek | 126/9 R |
| 3,828,759 | 8/1974 | Cooper | 126/9 R |

Primary Examiner—Albert J. Makay
Assistant Examiner—Harold Joyce
Attorney, Agent, or Firm—Clarence A. O'Brien; Harvey B. Jacobson

[57] ABSTRACT

A brazier which may be collapsed into a generally rectangular and horizontally elongated box-like structure including a bail-type handle for ease in transporting and which, when erected, includes an elevated fire pan over which a cooking grille is supported. The housing comprises upper and lower housing portions with the fire pan and cooking grille being supported in the upper portion of the housing and the lower portion of the housing comprising a storage compartment. The upper portion of the housing includes upstanding opposite side longitudinally extending upper side walls terminating upwardly in inwardly directed top wall portions having closely opposing free edge portions which may releasably secured together. The upper side walls are swingable toward horizontally and oppositely outwardly projecting open positions which are assumed when the brazier is in operation and the upper surfaces of the horizontally outwardly projecting upper side walls define horizontal support surfaces disposed on opposite sides of the fire pan when the brasier is in use. Food which has been cooked or which is to be warmed may be supported from these horizontal support surfaces, the free edges of the upper opposite side walls being provided with opposite end hingedly supported legs for support of the free edge portions of the upper side walls when the latter are in their horizontally disposed open positions.

3 Claims, 6 Drawing Figures

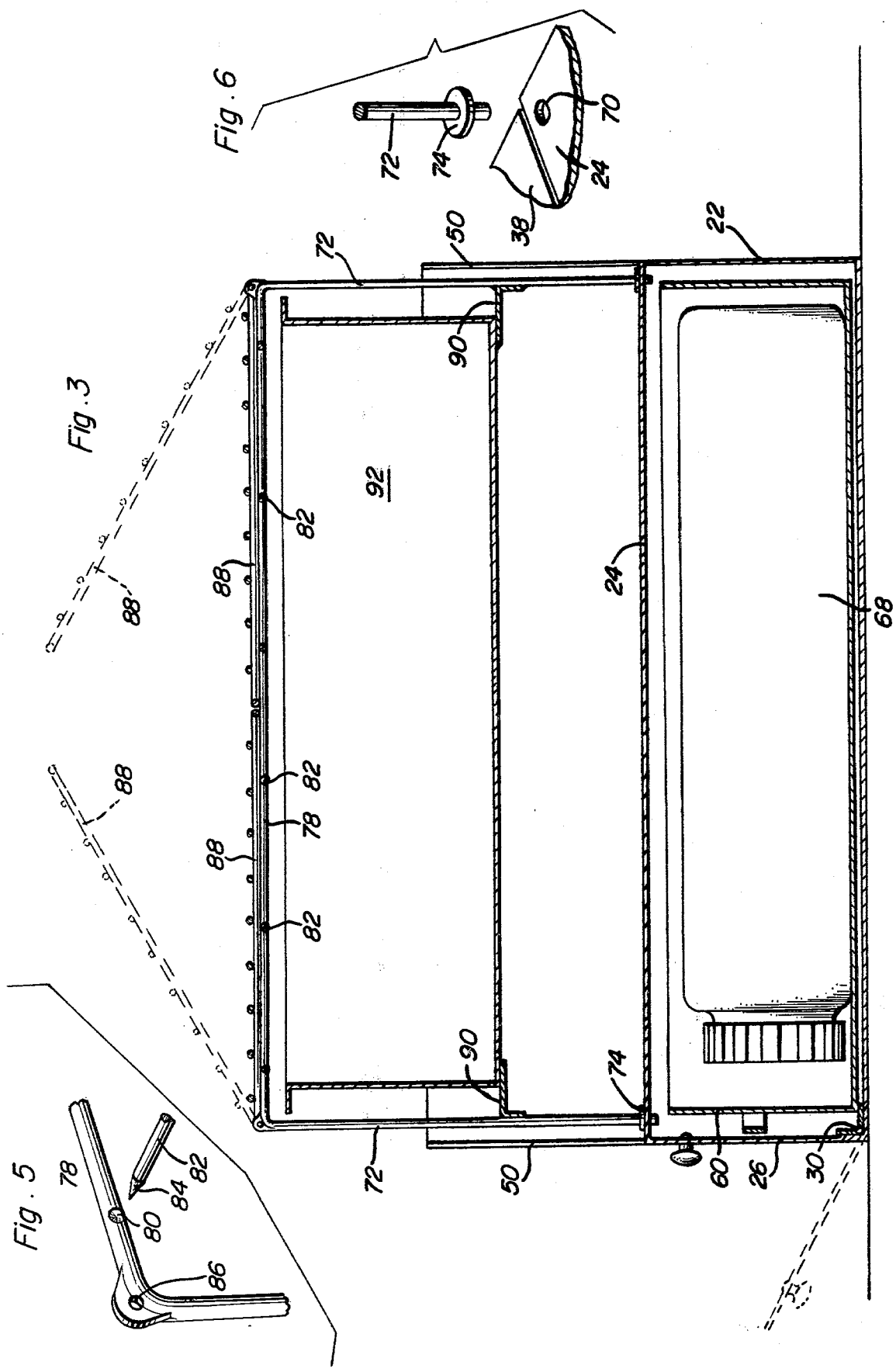

PORTABLE BRAZIER

BACKGROUND OF THE INVENTION

There have been various forms of portable braziers heretofore constructed, but most are constructed in a manner whereby they may not be readily transported from one place to another. In addition, other forms of portable braziers do not include sufficient storage space for items to be stored and may not be readily transformed into a compact state for manual carrying from one location to another within a short period of time after the brazier has been in user. Accordingly, a need exists for a portable brazier which may be collapsed or folded into a compact state for ease in manual transport from one location to another and which includes ample storage space and also is constructed in a manner whereby the brazier may be quickly folded into a compact state for transport immediately after the brazier has been in use.

Examples of portable cooking structures and other devices including some of the general structural and operational features of the instant invention are disclosed in U.S. Pat. Nos. 2,922,414, 3,124,057, 3,191,592, 3,195,422, 3,683,791 and 3,809,051. In addition, a portable brazier including many of the general structural features of the instant invention is disclosed in my prior U.S. Pat. No. 3,393,670.

BRIEF DESCRIPTION OF THE INVENTION

The portable brazier of the instant invention includes a housing construction including upper and lower portions with the lower portion including a pair of lower upstanding opposite side walls interconnected at their lower marginal edges by means of a bottom wall and at their upper marginal edge portions by means of a lower top wall. One end of the lower housing portion is closed by means of an end wall and the other end of the lower housing portion is open and telescopingly slidingly receives a pair of storage trays therein. The upper portion of the housing consists of a pair of upper opposite side walls hingedly mounted along the lower marginal edge portions to the upper marginal edge portions of the lower side walls for swinging movement between upstanding closed positions and oppositely horizontally outwardly projecting open positions. The upper ends of the upper side walls include inwardly projecting generally horizontal top wall portions having closely opposing free marginal edges which may be releasably secured together and one of the free marginal edge portions of the top wall portions includes a bail-type handle. Still further, the upper marginal edge portions of the upper side walls include opposite end hingedly supported legs which may be swung into positions projecting outwardly from the outer surfaces of the upper side walls and utilized as support structures for the outer free marginal portions of the upper side walls when the latter are in their open horizontally disposed positions.

Opposite end portions of the opposite side longitudinal marginal edges of the lower top wall support the lower ends of uprights from whose upper ends a horizontal food cooking grille is supported and a fire pan is supported from the uprights below the food cooking grille and in spaced relation above the lower top wall. Still further, the upper or inner surfaces of the upper side walls, when the latter are in their horizontally disposed open positions, are disposed on opposite sides of the fire pan and can be utilized as support surfaces for warming foods or for maintaining cooked foods when the brazier is in operation.

The main object of this invention is to provide a foldable and portable brazier of the type hereinabove set forth and which may be readily transported from one location to another and yet which may be extended and erected in an operative condition with a minimum amount of effort.

Another object of this invention is to provide a brazier in accordance with the immediately preceding object and which may be readily constructed primarily of sheet material so as to be more economical.

Still another object of this invention is to provide a brazier of the collapsible type and which will provide a relatively large cooking area in relation to the plan area of the brazier when the latter is in its collapsed position.

A further object of this invention is to provide a brazier which will afford an even greater area upon which to place foods to be warmed or cooked foods to be maintained warm.

Another important object of this invention is to provide a portable brazier of the type including ample storage areas.

A still further object of this invention is to provide a portable brazier constructed in a manner whereby it may be readily folded into a compact state within a short time after the brazier has been in use.

A final object of this invention to be specifically enumerated herein is to provide a foldable and portable brazier in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a longitudinal, vertical, sectional view taken substantially upon a plane extending longitudinally centrally through the brazier illustrated in FIG. 2 and with alternate positions of the cooking grille members thereof illustrated in phantom lines;

FIG. 4 is an exploded, perspective view of the fire pan and cooking grille portions of the invention as well as the supportive structure therefor and also a spit which may be utilized in conjunction with the brazier;

FIG. 5 is an enlarged, fragmentary, perspective view of the lower left hand corner portion of the grille support structure illustrated in FIG. 4 and with one of the transverse connecting portions thereof illustrated in exploded position; and FIG. 6 is a fragmentary, enlarged, perspective view of one corner portion of the top wall of the lower housing portion and with one of the grille supporting uprights normally supported therefrom illustrated in exploded position.

DETAILED DESCRIPTION OF THE INVENTION

Figure 1:
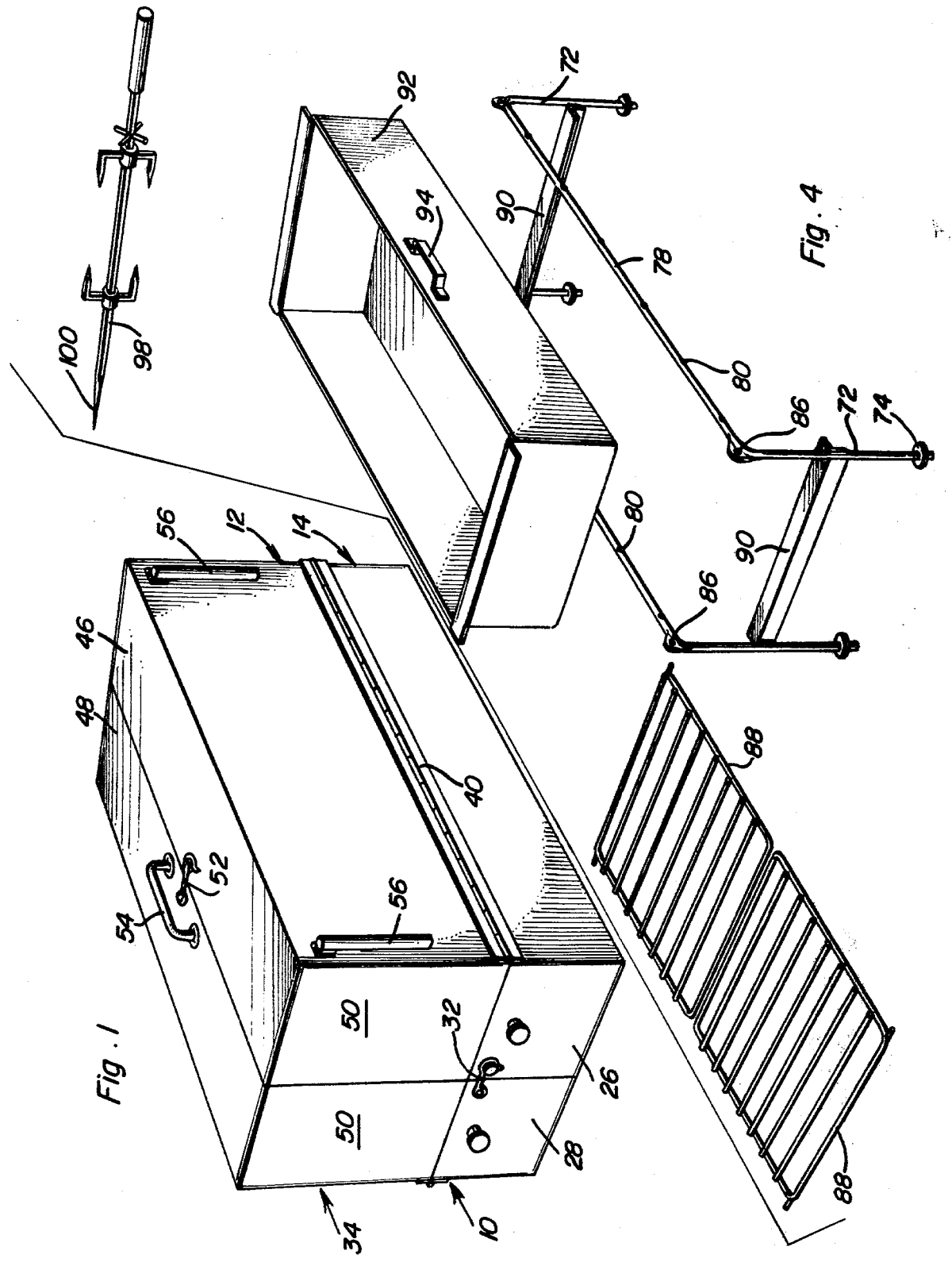
FIG. 1 is a perspective view of a portable brazier in a folded compact position for ease of manual transport from one location to another.

Referring now more specifically to the drawings, the numeral 10 generally designates the foldable brazier of the instant invention. The brazier 10 includes a housing referred to in general by the reference numeral 12 defining a lower portion 14 including a pair of upstanding opposite side lower side walls 16 and 18 interconnected by means of a bottom wall 20 extending and secured therebetween. One end of the lower portion 14 is closed by means of an end wall 22 and the upper marginal edge portions of the lower side walls 16 and 18 are interconnected by means of a lower top wall 24 extending and secured therebetween. The end of the lower portion 14 remote from the end wall 22 is open and includes a pair of hinged closure doors 26 and 28 hingedly supported from the corresponding end of the bottom wall 20, as at 30. A latch structure 32 is provided for removably connecting the doors 26 and 28 together when the latter are in their closed positions illustrated in solid lines in FIGS. 1 and 3.

The housing 12 additionally includes an upper portion 34 consisting of a pair of opposite side upper side walls 36 and 38 whose lower marginal edge portions are hingedly secured, as at 40, to the upper marginal edge portions of the corresponding lower side walls 16 and 18. The upper ends of the upper side walls 36 include inwardly directed partial top wall portions 46 and 48 and it may be seen from FIGS. 1 and 2 of the drawings that a partial end wall 50 extends between each pair of corresponding end edge marginal portions of the side walls 36, 46 and 38, 48 whereby the entire upper portion 34 of the housing 12 may be closed when the upper side walls 36 and 38 are swung to their closed vertical positions illustrated in FIG. 1 and in phantom lines in FIG. 2. A latch structure 32 is provided for releasably securing the top wall portions 46 and 48 together and thus the upper portion 34 of the housing 12 in a closed position and the top wall portion 48 includes a bail-type handle 54 whereby the entire brazier 10 may be carried in a compact folded condition in the manner of a suitcase or tool box, and the like.

Figure 2:
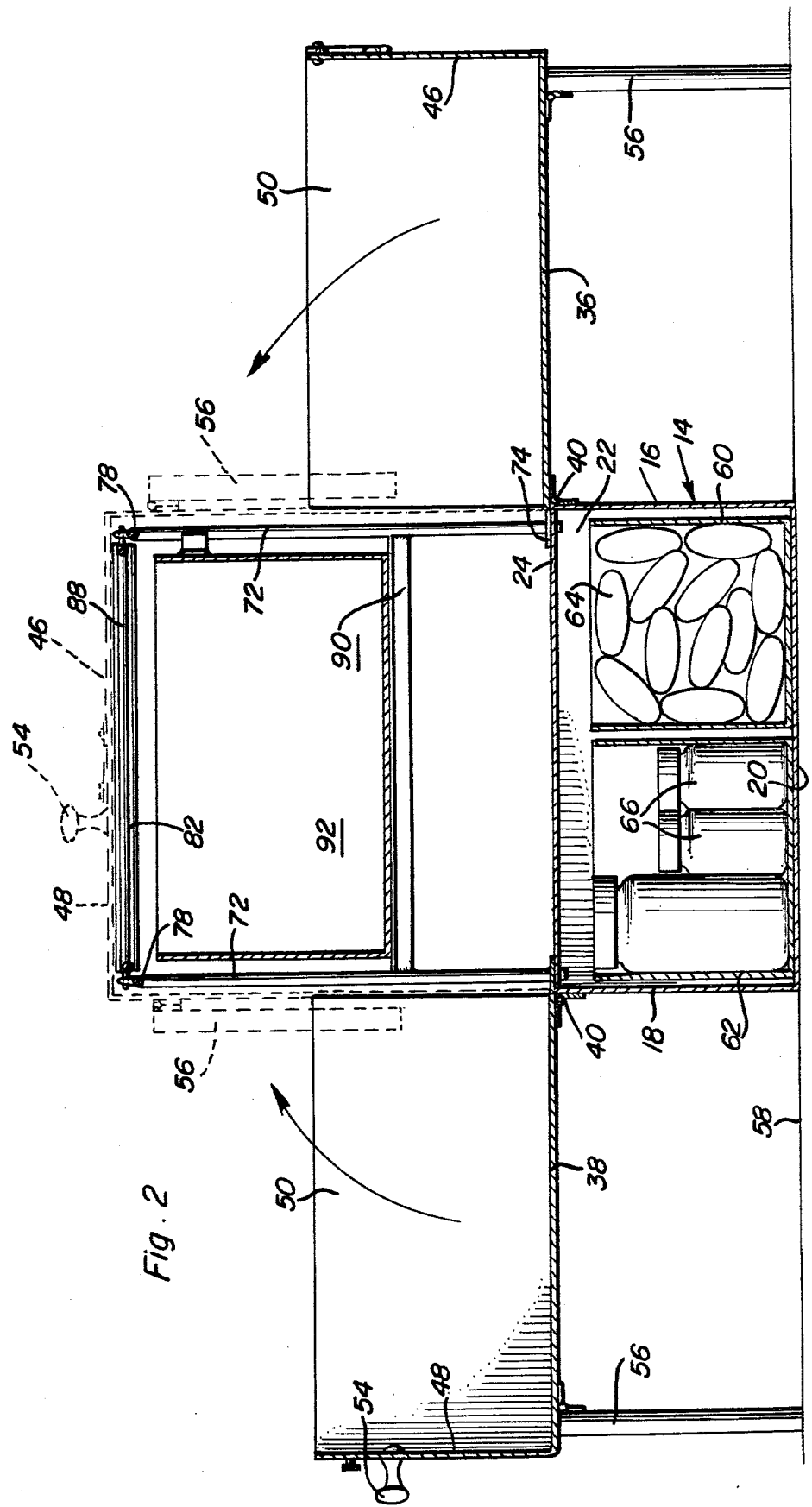
FIG. 2 is an enlarged, transverse, vertical, sectional view of the portable brazier with the top housing portion thereof in an open position and the closed position thereof illustrated in phantom lines.

The upper side walls 36 and 38 are swingable toward oppositely outwardly directed horizontal positions such as those illustrated in solid lines in FIG. 2 and the free swinging edge portions of the upper side walls 36 and 38 include hingedly supported legs 56 whereby the free edges of the upper side walls 36 and 38 may be supported from the surface 58 upon which the housing 12 rests when the upper side walls 36 and 38 are in their open positions.

The interior of the lower portion 14 slidingly receives a pair of upwardly opening drawers 60 and 62 in which various articles, such as charcoal 64 and food jars 66, may be stored, or a horizontally elongated charcoal container 68 may be received in one side of the lower portion 14 of the housing 12, see FIG. 3.

The four corner portions of the lower top wall 24 are provided with upstanding apertures 70 in which the lower ends of a plurality of uprights 72 are received. The lower ends of the uprights 72 include abutments 74 spaced above the lower terminal ends thereof engageable with the top wall 24 about the corresponding apertures or bore 70 and the uprights 72 at each side of the housing 12 include an upper horizontal and longitudinal members 78 extending between the upper ends thereof. The horizontal members 78 are provided with aligned transverse bores 80 and longitudinally spaced and transversely extending brace members 82 including tapered opposite ends 84 are supported with their opposite ends received in the bores 80. Further, the upper end of each upright 72 defines a horizontal transverse bore 86 and one end of a grille member 88 is pivotally supported from the bores 86 at each end of the housing 12, the grille members 88 resting upon the transverse members 82 and being upwardly swingable from the horizontal solid line positions thereof illustrated in FIG. 3 past the inclined phantom line positions thereof illustrated in FIG. 3.

The vertical midportions of the uprights 72 at each end of the housing 12 are interconnected by means of an angle member 90 extending and secured therebetween and the opposite ends of an upwardly opening fire pan 92 equipped with a side handle 94 are supported from the angle members 90 for support of the pan 92 therefrom.

With attention now invited more specifically to FIG. 2 of the drawings, it may be seen that when the grille members 88 are in their horizontal positions and the fire pan 92 is supported from the support members 90, the upper side walls 36 and 38 of the upper portion 34 of the housing 12 may be swung to their closed positions. Thus, if in the event of inclement weather or for any other reason it becomes necessary quench a fire in the fire pan 92 by pouring water thereon, the housing 12 may be quickly folded to its closed position and transported by hand from one location to another. Inasmuch as the top wall portion 48 which supports the handle 54 is positioned considerably remote from the fire pan 92 when the latter is in operation and the handle 54 is supported from the top wall portion 48 remote from the fire pan 92, it is believed readily apparent that the handle 54 may be utilized to carry the housing 12 immediately after a fire within the fire pan 92 has been quenched.

In FIG. 4 of the drawings, there is also illustrated a spit referred to in general by the reference numeral 98. If it is desired, one of the grille members 92 may be swung toward an inoperative position and the spit 98 may be supported from the members 78. In addition, one of the transverse member 82 may be removed and the pointed end 100 of the spit 98 may be rotatably received in one of the empty bores 80.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A foldable and portable brazier including an elongated lower housing portion defined between a pair of lower upstanding opposite side walls interconnected at their lower marginal edges by means of a bottom wall extending and secured therebetween and an upper housing portion including a pair of upstanding upper opposite side walls hingedly supported along their lower marginal edge portions to the upper marginal edge portions of said lower side walls for swinging between upstanding closed positions and oppositely outwardly projecting generally horizontal open positions, the upper marginal portions of said upper side walls including inwardly directed top wall portions supported therefrom and including closely opposing free marginal edge portions removably anchorable together when said upper side walls are in the closed positions, a lower top wall extending and secured between the upper marginal edges of said lower side walls, opposite end pairs of opposite side uprights supported from and projecting above corresponding opposite longitudinal ends of said lower top wall, a generally horizontal food cooking grille supported from the upper end portions of said uprights, and a generally horizontal fire pan supported from said uprights beneath said grille in elevated position above said lower top wall, said uprights and cooking grille being fully receivable between said upper side walls and below said top wall portions when said upper side walls are in their closed positions, corresponding ends of corresponding upper side and top wall portions each including an inwardly and downwardly directed partial end wall, said partial end walls closing the ends of the interior of said upper housing portion when said upper side walls are in the closed positions, said lower housing portion including an end wall extending between corresponding end marginal edge portions of said lower side walls, said lower top wall and said bottom wall, the end of said lower housing portion remote from said end wall being open, and a pair of side-by-side sliding tray means slidingly telescopingly received in said open end of said lower housing portion and an upper horizontal connecting member extending and secured between each pair of uprights on each side of the housing, the lower end portions of the uprights adjacent each end of the housing including a horizontal brace member secured and extending therebetween, and the end portions of said fire pan adjacent the corresponding ends of said housing being removably supported from the corresponding brace members in elevated position above the lower housing portion, said cooking grille being supported from said horizontal connection members.

2. The combination of claim 1 wherein said connecting members include registered horizontal transverse bores formed therethrough at points widely spaced apart along said connecting members, and a plurality of support bars having their opposite ends removably supported in said bores, said cooking grille being supported, at least in part, from said support bars.

3. The combination of claim 1 wherein said grille includes a pair of generally horizontal coplanar grille members spaced along said connecting members, the remote marginal edge portions of said grille members being pivotally supported from the corresponding end portions of said connecting members for oscillation about axes extending therebetween and for swinging of said grille members from horizontal operative positions toward upstanding inoperative positions with the adjacent marginal portions of said grille members swinging upwardly and away from each other.

* * * * *